(12) United States Patent
Monks

(10) Patent No.: US 6,634,915 B2
(45) Date of Patent: Oct. 21, 2003

(54) APPARATUS AND METHOD FOR ROTATING AND INSPECTING CATHODE-RAY TUBE PANELS

(75) Inventor: Christopher Monks, Greensburg, PA (US)

(73) Assignees: Sony Corporation (JP); Sony Electronics, Inc., Park Ridge, NJ (US)

( * ) Notice: Subject to any disclaimer, the term of this patent is extended or adjusted under 35 U.S.C. 154(b) by 215 days.

(21) Appl. No.: 09/875,020

(22) Filed: Jun. 7, 2001

(65) Prior Publication Data

US 2002/0187704 A1 Dec. 12, 2002

(51) Int. Cl.[7] .............................................. H01T 21/06
(52) U.S. Cl. .............................. 445/3; 445/65; 445/67; 445/68; 33/552; 33/553
(58) Field of Search ............................. 445/68, 67, 63, 445/3, 66, 2, 61, 65, 24; 315/378; 331/552, 553

(56) References Cited

U.S. PATENT DOCUMENTS

| | | | |
|---|---|---|---|
| 3,899,812 A | * | 8/1975 | Baranski et al. |
| 4,164,060 A | * | 8/1979 | Hartta |
| 4,907,999 A | * | 3/1990 | Sbordonne |
| 5,941,749 A | * | 8/1999 | Brunetti et al. |
| 6,254,448 B1 | * | 7/2001 | Ho |
| 6,514,110 B1 | * | 2/2003 | Hirayama et al. |

* cited by examiner

Primary Examiner—Dean A. Reichard
Assistant Examiner—Ha Nguyen
(74) Attorney, Agent, or Firm—Rader Fishman & Grauer PLLC; Ronald P. Kananen

(57) ABSTRACT

An apparatus for rotating a CRT panel (12) to facilitate inspecting a seal edge (13) thereof includes a support structure (30) rotatably connected to a base frame (21) for rotation about a horizontal axis (31). The CRT panel (12) is placed into the support structure (30) with the seal edge (13) positioned in a holding groove (77) formed on a bottom door assembly (40). A top door assembly (58) is slidable to a closed position to enclose and support the CRT panel (12) while the support structure (30) is rotated 180 degrees. The bottom door assembly (40) is movable to an open position to inspect the seal edge (13). The door assemblies (40, 58) are both arranged to engage the base frame (21) and prevent rotation of the support structure (30) relative to the base frame (21) when the door assemblies are moved to their respective open positions.

17 Claims, 4 Drawing Sheets

APPARATUS AND METHOD FOR ROTATING AND INSPECTING CATHODE-RAY TUBE PANELS

BACKGROUND OF THE INVENTION

1. Field of the Invention

The present invention relates generally to recycling of cathode-ray tubes ("CRTs"), and more particularly, to an apparatus and method for rotating CRT panels to facilitate inspecting the seal edges of the panels.

2. Description of the Related Art

In recent years, there has been an increased demand for recycling of natural resources and prevention of environmental destruction. To meet this demand, studies and efforts have been made to reuse CRTs of used television sets and computer monitors.

A CRT, used as an image receiver incorporated in a television set, computer monitor, and the like, is a glass structure composed of a panel portion (also called a face portion) and a funnel portion (also called a panel skirt portion). The panel portion is made from a substantially transparent glass material for improving light transmittance, and the funnel portion is made from a glass material in which lead is mixed for preventing leakage of X-rays caused by collision of electron beams accelerated at a high voltage with a substance. The funnel portion and the panel portion are welded in a shield fashion to each other with frit glass (solder glass) into a tube shape.

Outwardly, an electron gun, a deflection yoke and the like are mounted on the external rear side of a CRT, and a shadow mask (or aperture grill) is provided in the CRT. A fluorescent screen provided on the inner surface side of the panel portion is normally coated with phosphors of three colors (red, green and blue).

Methods of recycling CRTs have been disclosed, for example, in U.S. Pat. Nos. 5,752,868 and 6,089,937. In these known methods, the CRTs are separated into a panel portion and a funnel portion, and the separate components are cleaned, inspected and recycled to make another CRT.

When the panel portion is separated from the funnel portion, the panel portion is cleaned and the seal edge is then inspected. The weight of CRT panel portions for large CRTs (e.g., 32 to 36 inch diagonal) is typically between 60 to 100 pounds, and therefore, suction cup lifts are required to pick up the panel portion and place it on a designated inspection surface. The suction cups can only pick the panel portion up by its face and place it with the seal edge down. Therefore, to inspect the seal edge, the panel portion must be rotated, preferably without picking the panel up physically by hand. An apparatus for holding and rotating the panel portions to facilitate this inspection process is needed.

SUMMARY OF THE INVENTION

It is an object of the present invention to provide an apparatus and method for holding and rotating CRT panels to facilitate inspecting the seal edges of the panels during CRT recycling.

It is a further object of the present invention to provide an apparatus for holding and rotating CRT panels which is economical to manufacture, efficient in use, capable of a long operating life, and particularly well adapted for use in inspecting seal edges of CRT panels during recycling processes.

According to the present invention, an apparatus for holding and rotating CRT panels is provided to facilitate inspecting a seal edge of the CRT panels during recycling. The apparatus includes a base frame and a support structure rotatably connected to the base frame for rotation about a horizontal axis. The CRT panel is placed into the support structure with the downward facing seal edge of the CRT panel positioned in a holding groove formed on an inner side of a bottom door assembly. A top door assembly is slidable to a closed position to enclose and support the CRT panel. The support structure is then rotatable approximately 180 degrees until the seal edge of the CRT panel is facing upward. The bottom door assembly is rotatable to an open position to allow inspection of the upward protruding seal edge of the CRT panel.

The top door assembly of the support structure is arranged to engage the base frame and prevent rotation of the support structure when the top door assembly is slid to its open position. The bottom door assembly is arranged to engage the base frame and prevent rotation of the support structure when the bottom door assembly is rotated to its open position.

According to a broad aspect of the present invention, an apparatus for holding and rotating CRT panels is provided, comprising a base frame and a support structure rotatably connected to the base frame for rotation about a generally horizontal axis. The support structure has a first side and a second side and a generally open construction between the first and second sides. The support structure has a first door assembly movable between a first position in which at least a portion of the first side is covered by the first door assembly, and a second position in which the first side is substantially open. The support structure also has a second door assembly movable between a first position in which the second side is substantially open for receiving a CRT panel portion, and a second position in which at least a portion of the second side is covered by the second door assembly.

According to another broad aspect of the present invention, an apparatus is provided for rotating heavy objects to facilitate inspecting a bottom side thereof. The apparatus comprises a base frame and a support structure rotatably connected to the base frame for rotation about a generally horizontal axis. The support structure has a first viewing side, a second receiving side, and a receptacle defined between the first and second sides. A first door assembly comprises at least one door rotatably mounted to the support structure to selectively open and close the first viewing side of the support structure. The first door assembly is arranged to engage the base frame and prevent rotation of the support structure when the first viewing side is open. A second door assembly comprises at least one door slidably mounted to the support structure to selectively open and close the second receiving side of the support structure. The second door assembly is arranged to engage the base frame and prevent rotation of the support structure when the second receiving side is open According to still another broad aspect of the present invention, a method of rotating and inspecting CRT panels is provided, comprising the steps of: separating a CRT into a funnel portion and a panel portion; providing a rotatable support structure having a closed first side and an open second side; placing the panel portion into the support structure through the open second side; closing the open second side of the support structure to form an enclosure surrounding the panel portion; rotating the support structure approximately 180 degrees; opening the second side of the support structure; and inspecting a seal edge of the CRT panel protruding through the open second side of the support structure Numerous other objects of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

An apparatus and method for rotating CRT panels to facilitate inspecting the seal edges of the panels according to the present invention will be described below with reference to FIGS. 1 to 7 of the accompanying drawings.

Figure 1:
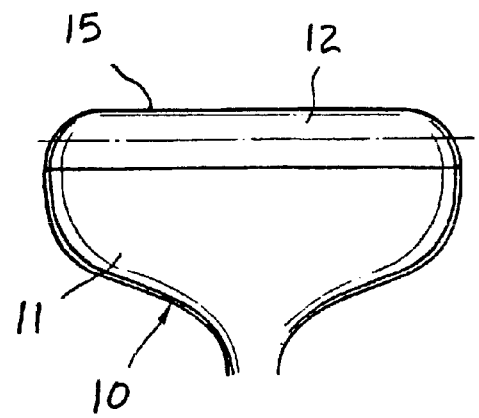
FIG. 1 is an elevation view of an intact CRT to be recycled.
Figure 2:
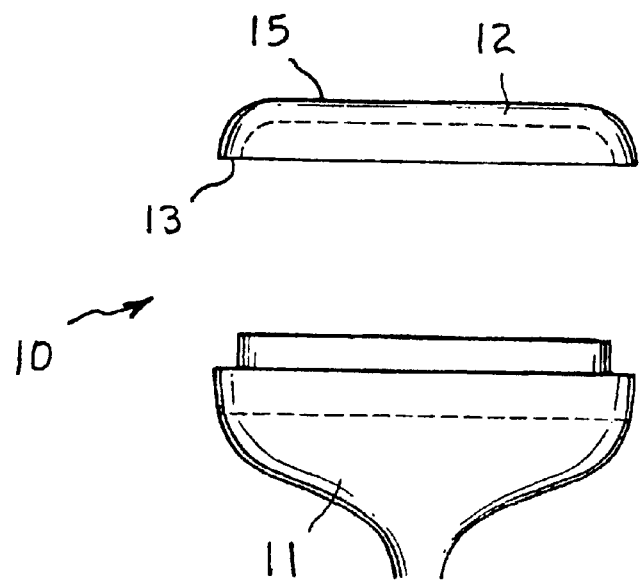
FIG. 2 is an elevation view of the CRT shown in FIG. 1 with the panel portion separated from the funnel portion.

FIG. 1 shows an intact CRT 10 having a funnel portion 11 connected to a panel portion 12 by frit glass welding or the like. The CRT 10 can be a newly manufactured CRT that failed a quality inspection, or a used or damaged CRT to be recycled. The panel portion 12 is separated from the funnel portion 11, as shown in FIG. 2, using acid to dissolve the frit glass weld and a known thermoshock process. Once separated from the funnel portion 11, the panel portion 12 is oriented with its seal edge 13 facing downward and can be cleaned and lifted in a known manner using a suction cup lift 14 or the like. The suction cup lift 14 can only pick the panel portion 12 up by its face 15 and place it with the seal edge 13 facing downward.

Figure 3:
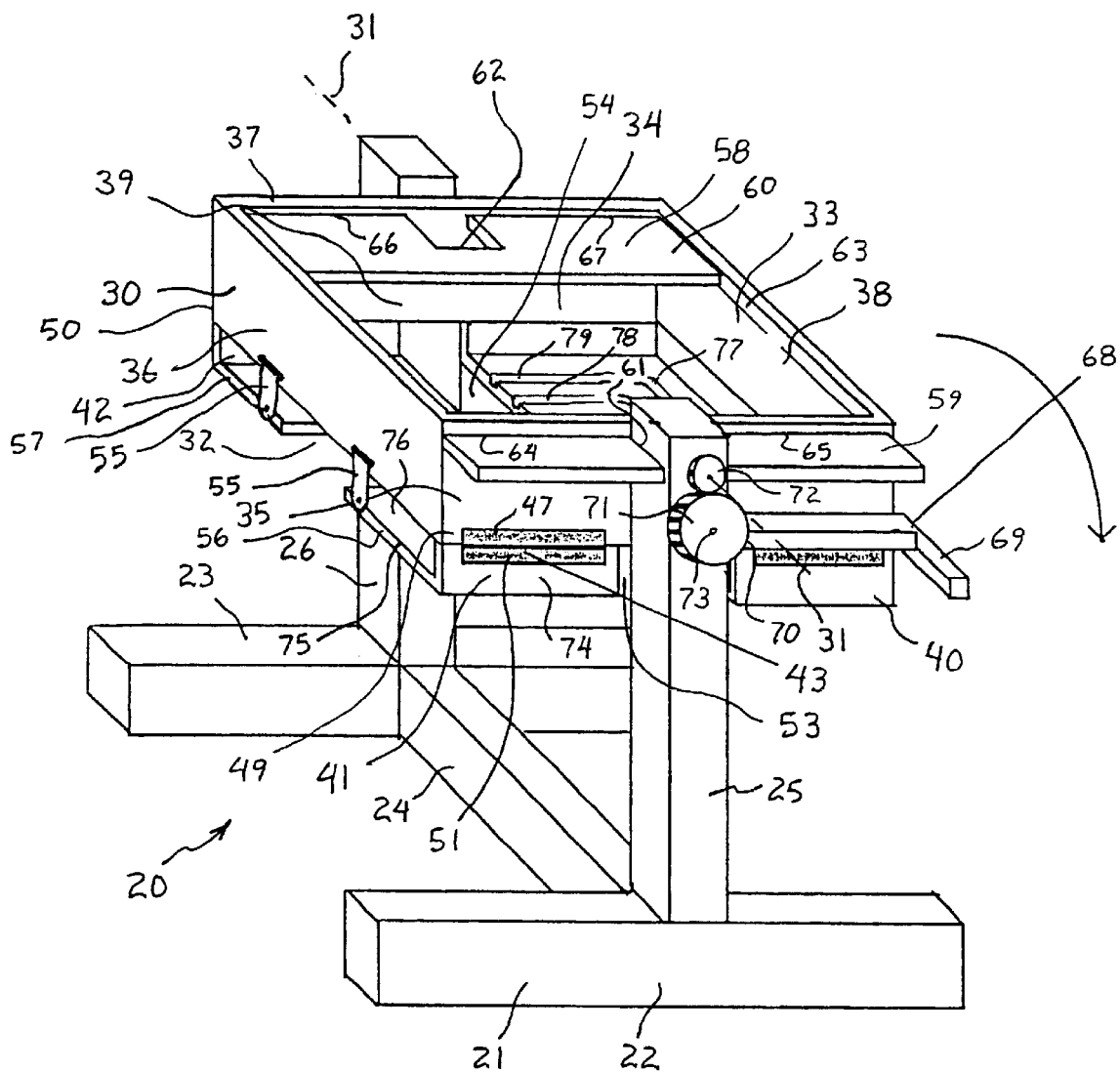
FIG. 3 is a perspective view of an apparatus for holding and rotating a panel portion of a CRT according to the present invention.

An apparatus 20 for holding and rotating the separated CRT panel portion 12 to facilitate inspection of the seal edge 13 is shown in FIG. 3. The apparatus 20 includes a base frame 21 having first and second horizontal members 22, 23, and a third horizontal member 24 connected between the first and second horizontal members 22, 23 to form a generally H-shaped configuration. A pair of upstanding members 25, 26 are connected to the first and second horizontal members 22, 23 near the respective ends of the third horizontal member 24. The upstanding members 25, 26 have respective bearings 27 or the like supported at an upper end thereof for rotatably supporting a pair of shafts 28 protruding from each side of a support structure 30.

The support structure 30 is rotatably connected to the base frame 21 for rotation about a generally horizontal axis 31. The support structure 30 has a first bottom side 32, a second top side 33, and a generally open construction 34 between the bottom and top sides 32, 33. First, second, third and fourth side walls 35–38 extend between the bottom and top sides 32, 33 to form a box-shaped receptacle 39. The side walls 35–38 are generally planar members connected to one another at their respective ends to form the box-shaped receptacle 39. The first and third side walls 35, 37 extend generally perpendicular to the horizontal axis 31 on opposite sides of the box-shaped receptacle 39 from each other, and the second and fourth side walls 36, 38 extend generally parallel to the horizontal axis 31 on opposite sides of the box-shaped receptacle 39 from each other.

Figure 5:
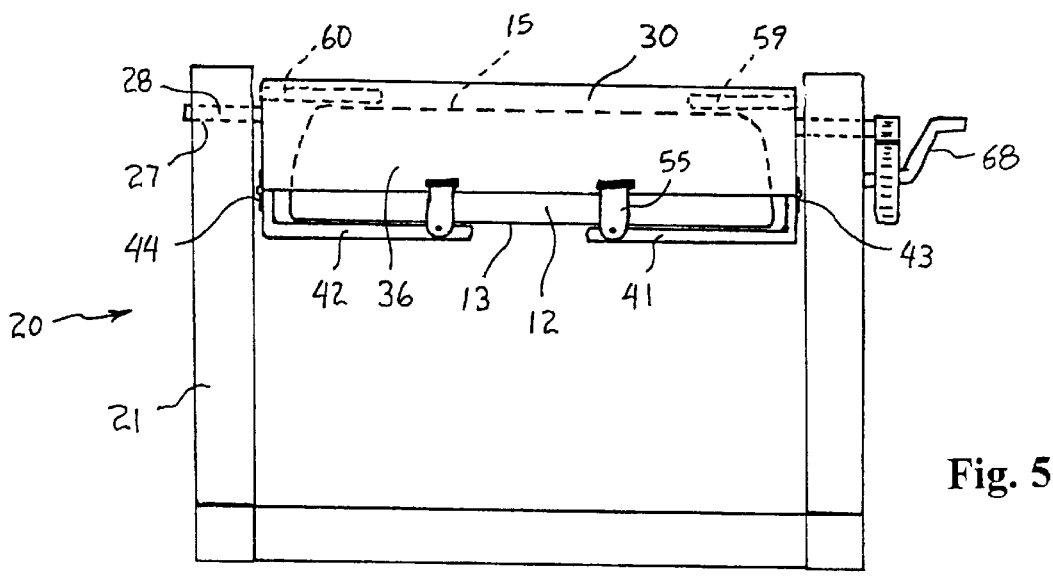
FIG. 5 is an elevation view of the apparatus shown in FIG. 3 with a CRT panel portion received in the support structure and ready to rotate.
Figure 6:
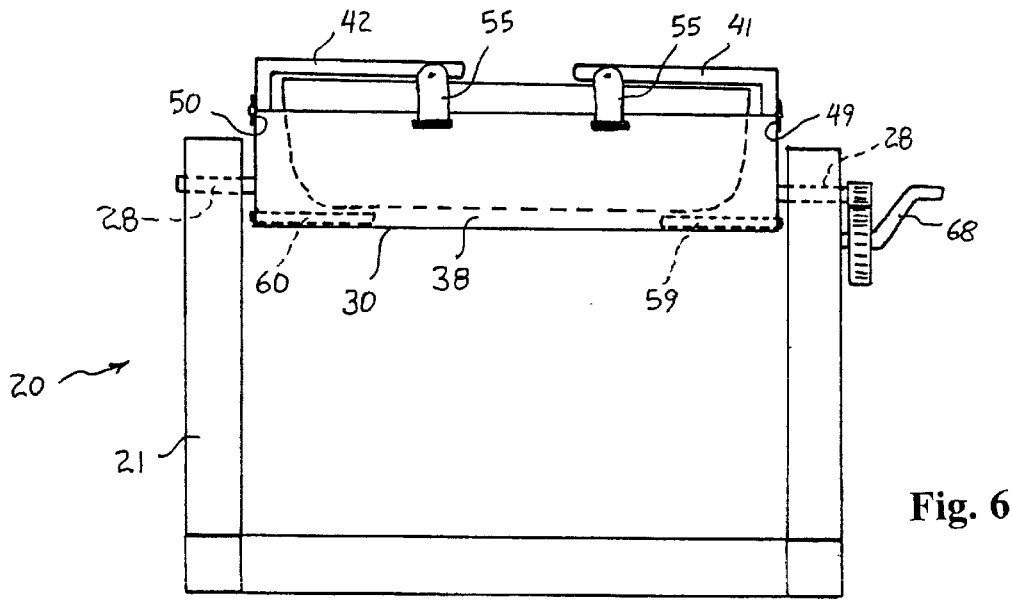
FIG. 6 is an elevation view of the apparatus shown in FIG. 3 with the support structure and CRT panel portion rotated 180 degrees from the position shown in FIG. 5.
Figure 7:
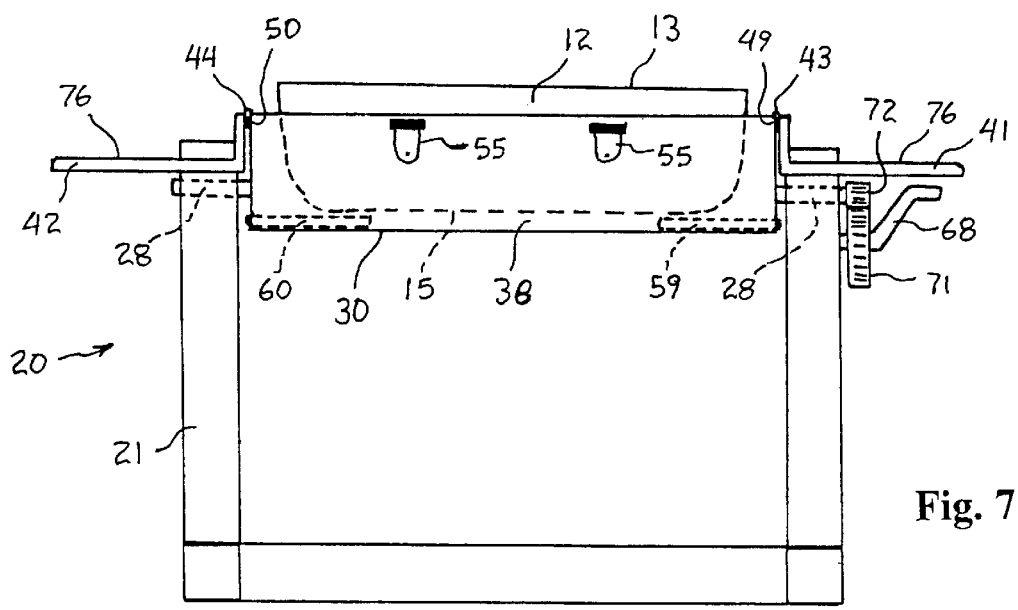
FIG. 7 is an elevation view of the apparatus shown in FIG. 3 with a first door assembly of the support structure in an open position to allow inspection of the seal edge of the CRT panel portion.

A first bottom door assembly 40 is arranged to selectively cover the bottom side 32 of the support structure 30. The bottom door assembly 40 includes first and second doors 41, 42 which are rotatably connected to the first and third side walls 35, 37, respectively, using first and second pairs of hinges 43, 44. The hinges 43, 44 allow rotation of the doors 41, 42 about respective axes 45, 46 that extend generally perpendicular to the horizontal axis 31 of the support structure 30. A first side 47, 48 of each hinge 43, 44 is connected to a respective bottom edge 49, 50 of the first and third side walls 35, 37, and a second side 51, 52 of each hinge 43, 44 is connected to the respective first and second doors 41, 42. The hinges 43, 44 allow a 180-degree rotational movement of the first and second doors 41, 42 between a first closed position, as shown in FIGS. 3 to 6, and a second open position, as shown in FIG. 7. The bottom side 32 of the support structure 30 is closed by the bottom door assembly 40 when the first and second doors 41, 42 are in their first closed position, and open when the first and second doors 41, 42 are in their second open position.

The first and second doors 41, 42 extend across the length of the first and third side walls 35, 37 and have cutout portions 53, 54 to accommodate the upstanding members 25, 26 of the base frame 21. The hinges 43, 44 are connected to the doors 41, 42 on either side of the respective cutout portions 53, 54. Alternatively, the bottom door assembly 40 can be formed of four separate doors (i.e., a separate door associated with each hinge), or a single door pivotally connected to the first side wall 35 or the third side wall 37 which spans across to the other side.

A latch assembly 55 is associated with the bottom door assembly 40 for latching the first and second doors 41, 42 in their first closed position. The latch assembly 55 can be a simple hook or loop member or other suitable fastener that extends between the second and fourth side walls 36, 38 and the respective side edges 56, 57 of the doors 41, 42. Alternatively, a spring can be used in connection with each hinge to bias the doors 41, 42 into their closed position.

Figure 4:
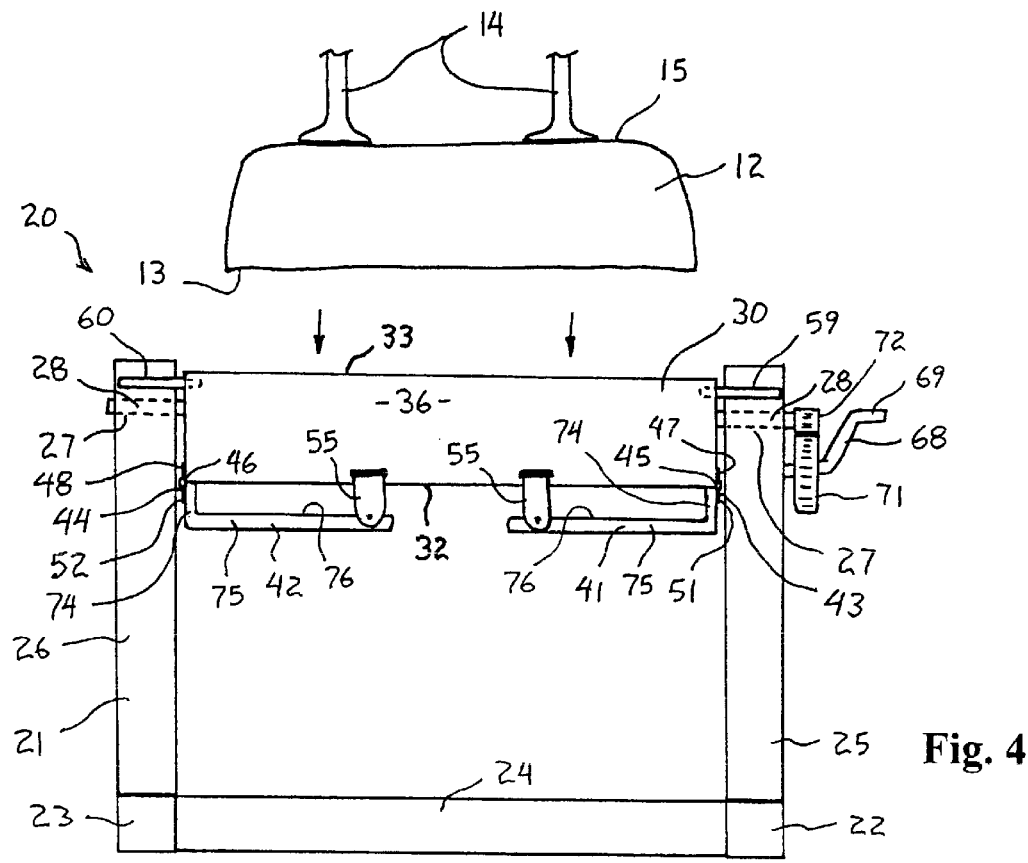
FIG. 4 is an elevation view of the apparatus shown in FIG. 3 with a support structure ready to receive a panel portion of a CRT.

A second top door assembly 58 is arranged to selectively cover the top side 33 of the support structure 30. The top door assembly 58 includes first and second doors 59, 60 which are slidably mounted to the support structure 30 for sliding movement between a first open position, as shown in FIGS. 3 and 4, and a second closed position, as shown in FIGS. 5 to 7. In the first open position, the top side 33 of the support structure 30 is substantially open for receiving a CRT panel portion 12. In the second closed position, the top side 33 of the support structure 30 is substantially closed to define an enclosure about the CRT panel portion 12 received in the support structure 30.

The first and second doors 59, 60 of the top door assembly 58 each have a cutout portion 61, 62 to accommodate the upstanding members 25, 26 of the base frame 21 when the top door assembly 58 is in its first open position (FIG. 3). The first and second doors 59, 60 of the top door assembly 58 are supported at their respective ends in grooves 63 or guide rails on the inner sides of the second and fourth side walls 36, 38. The doors 59, 60 of the top door assembly 58 pass through openings 64–67 in the first and third side walls 35, 37 as they slide between their open and closed positions.

A crank 68 with a handle 69 is provided to facilitate rotation of the support structure 30 about the horizontal axis 31. The crank 68 is rotatably connected at one end 70 to one of the upstanding members 25 of the base frame 21. A first gear 71 is associated with the crank 68 to engage and rotate a second gear 72 secured to an end of one of the shafts 28 supporting the support structure 30. The second gear 72 is arranged to rotate about the horizontal axis 31 with the support structure 30, while the first gear 71 is arranged to rotate about the rotational axis 73 of the crank 68. As shown in the drawings, the first gear 71 has a larger diameter than the second gear 72 to provide a desired gear ratio between the first and second gears 71, 72. Alternatively, the crank 68 can be connected directly to the rotational shaft 28 of the support structure 30 to rotate the same without interconnecting gears.

The sliding doors 59, 60 of the top door assembly 58 are arranged to engage the upstanding members 25, 26 of the base frame and prevent rotation of the support structure 30 when the top door assembly 58 is in its open position, as shown in FIGS. 3 and 4. This is useful to keep the support structure 30 properly positioned and stable when a CRT panel portion 12 is being placed in the support structure 30.

The rotational doors 41, 42 of the bottom door assembly 40 are also arranged to engage the upstanding members 25, 26 of the base frame 20 and prevent rotation of the support structure 30 when the bottom door assembly 40 is in its open position, as shown in FIGS. 5 to 7. This is useful to keep the support structure 30 properly positioned and stable when a CRT panel portion 12 contained in the support structure 30 is being inspected.

The doors 41, 42 of the bottom door assembly 40 are L-shaped in cross-section with a short leg 74 of each L-shape connected to the hinges 43, 44 and a long leg 75 of each L-shape extending perpendicular to the short leg 74. The long leg 75 of each L-shaped door 41, 42 has an inner support surface 76 on which the CRT panel portion 12 is supported when the bottom door assembly 40 is in its closed position. The short leg 74 of each L-shaped door 41, 42 functions to offset the inner support surface 76 of the long leg 75 from the bottom edges of the side walls 35–38 of the support structure 30 when the bottom door assembly 40 is in its closed position.

The bottom door assembly 40 has a holding structure 77 on an upper surface 78 of the bottom doors 41, 42 for aligning and maintaining a CRT panel portion 12 in a desired position within the support structure 30. The holding structure 77 is preferably in the form of a plurality of grooves 78, 79 formed in the upper surface 76 of each of the bottom doors 41, 42. The grooves 78, 79 are preferably arranged to accommodate CRT panel portions 12 of different sizes. For example, a first groove 78 can be formed in each of the bottom doors 41, 42 to accommodate a CRT panel portion 12 for a 32-inch (diagonal) CRT, and a second groove 79 can be formed in each of the bottom doors 41, 42 to accommodate a 36-inch (diagonal) CRT. Alternatively, a plurality of projections can be secured at suitable locations on the bottom doors 41, 42 to provide the desired alignment and positioning of CRT panel portions of different sizes.

When the support structure 30 is pivoted 180 degrees from its initial receiving position shown in FIGS. 3 to 5, to its inspection position shown in FIGS. 6 and 7, the doors 41, 42 of the bottom door assembly 40 are pivotable 180 degrees from their closed position shown in FIG. 6 to their open position shown in FIG. 7. In this position, the doors 41, 42 of the bottom door assembly 40 engage the sides of the upstanding members 25, 26 of the base frame 21 and lock the support structure 30 against further rotation about the horizontal axis 31. As a result of the L-shaped configuration of the doors 41, 42, the seal edge 13 of the CRT panel portions 12 protrudes above the edges of the side walls 35–38 in the position shown in FIG. 7, which facilitates a full and convenient inspection of the entire perimeter of the seal edge 13.

The interior surfaces of the first and second door assemblies 40, 58 and the side walls 35–38 of the support structure 30 are preferably covered by a plastic material, such as the material identified by the proprietary name DELRON™, which protects the surfaces of the panel portions 12 from scratching, chipping or breaking when the panel portions 12 are supported and rotated by the support structure 30.

In operation, the CRT 10 is first separated into a funnel portion 11 and a panel portion 12, as shown in FIG. 2. The panel portion 12 is then lifted by the suction cup lift 14 attached to the face 15 of the panel portion 12, and placed into the receptacle 39 of the support structure 30 through the open top side 33 thereof, as shown in FIG. 4. At this point, the seal edge 13 of the panel portion 12 is facing downward and resting on the upper surface 76 of the bottom doors 41, 42, as shown in FIG. 5. The grooves 78, 79 on the bottom doors 41, 42 align and maintain the panel portion 12 in a desired position within the support structure 30. The upper doors 59, 60 are slid into their closed position to close the top side 33 of the support structure 30, as shown in FIG. 5.

With the panel portion 12 securely enclosed between the bottom door assembly 40 and the top door assembly 58 and held against lateral movement by one of the grooves 78, 79, the support structure 30 is rotated 180 degrees using the crank 68 from its receiving position shown in FIG. 5 to its viewing position shown in FIG. 6. In this position, the L-shaped bottom doors 41, 42 are above the panel portion 12, and the panel portion 12 rests on the interior surfaces of the sliding top doors 59, 60 which are now below the panel portion 12. The L-shaped doors 41, 42 are then unlatched from the side walls 35–38 and rotated 180 degrees from their closed position shown in FIG. 6 to their open position shown in FIG. 7. In this position, the L-shaped doors 41, 42 engage the sides of the upstanding frame members 25, 26 and prevent further rotation of the support structure 30 relative to the base frame 20. As shown in FIG. 7, the seal edge 13 of the panel portion 12 protrudes above the side walls 35–38 of the support structure 30 to facilitate inspecting the perimeter of the seal edge 13 for scratches, chips and other defects that might prevent the panel portion 12 from being reused effectively.

Once the seal edge inspection is completed, the L-shaped doors 41, 42 are pivoted back to their closed position and latched in place using the latch assemblies 55, the support structure 30 is rotated 180 degrees back to its original position using the crank 68, the top sliding doors 59, 60 are slid to their open position, and the CRT panel portion 12 is lifted from the support structure 30 using the suction cup lift 14. The support structure 30 is then ready to receive another CRT panel portion 12 for inspection.

While the invention has been specifically described in connection with specific embodiments thereof, it is to be understood that this is by way of illustration and not of limitation, and the scope of the appended claims should be construed as broadly as the prior art will permit.

What is claimed is:

1. An apparatus for rotating a CRT panel portion to inspect a seal edge thereof, comprising:
   a base frame;
   a support structure rotatably connected to said base frame for rotation about a generally horizontal axis, said support structure having a first side and a second side and a generally open construction between said first and second sides, said support structure having a first door assembly movable between a first position in which at least a portion of said first side is covered by said first door assembly and a second position in which said first side is substantially open for inspecting a seal edge of the CRT panel portion, and a second door assembly movable between a first position in which said second side is substantially open for receiving a CRT panel portion and a second position in which at least a portion of said second side is covered by said second door assembly.

2. The apparatus set forth in claim 1, wherein said first door assembly comprises a first pair of doors which are rotatably mounted to said support structure.

3. The apparatus set forth in claim 2, wherein said second door assembly comprises a second pair of doors which are slidably mounted to said support structure.

4. The apparatus set forth in claim 1, further comprising a crank operably connected to said support structure for rotating said support structure about said axis.

5. The apparatus set forth in claim 1, further comprising a latch assembly associated with said first door assembly for latching said first door assembly into its first position.

6. The apparatus set forth in claim 1, wherein said support structure has first, second, third and fourth side walls which extend between said first and second sides to form a box-shaped receptacle, said first and third side walls extending generally perpendicular to said horizontal axis and being on opposite sides of said box-shaped receptacle from each other, and said second and fourth side walls extending generally parallel to said horizontal axis and being on opposite sides of said box-shaped receptacle from each other.

7. The apparatus set forth in claim 6, wherein said side walls are generally planar members connected to one another at their respective ends to form said box-shaped receptacle.

8. The apparatus set forth in claim 6, wherein said first door assembly comprises first and second doors rotatably connected to said first and third side walls, respectively, for rotation about respective axes that extend generally perpendicular to said horizontal axis, said first and second doors being rotatable between a first closed position in which said first side of said support structure is substantially closed and a second open position in which said first side of said support structure is substantially open.

9. The apparatus set forth in claim 8, wherein said first and second doors of said first door assembly are arranged to engage said base frame and prevent rotational movement of said support structure relative to said base frame when said first and second doors are in their second open position.

10. The apparatus set forth in claim 1, wherein said first door assembly has a holding structure on a surface thereof facing said second side of said support structure when said first door assembly is in said first closed position, said holding structure being arranged to maintain a panel portion of a CRT in a desired position within the support structure during rotation thereof.

11. The apparatus set forth in claim 10, wherein said first door assembly comprises first and second doors which are rotatably mounted to said support structure, and said holding structure comprises at least one groove formed in the surface of each of said first and second doors.

12. The apparatus set forth in claim 11, wherein said holding structure comprises a plurality of grooves formed in the surface of each of said first and second doors, said plurality of grooves being arranged to accommodate CRT panel portions of different sizes.

13. The apparatus set forth in claim 1, wherein said first door assembly is arranged to engage said base frame and prevent rotational movement of said support structure relative to said base frame when said first door assembly is in its second open position.

14. The apparatus set forth in claim 13, wherein said second door assembly is arranged to engage said base frame and prevent rotational movement of said support structure relative to said base frame when said second door assembly is in its second open position.

15. The apparatus set forth in claim 1, wherein said support structure comprises four side walls connected together at their ends to form a generally box-shaped receptacle, said first door assembly comprises at least one door rotatably mounted to a first edge of one of said side walls and having a generally L-shaped cross section with one leg of the L-shape being offset from said first edge, and said second door assembly comprises at least one door slidably mounted to said support structure.

16. The apparatus set forth in claim 15, wherein said first door assembly is arranged to engage said base frame and prevent rotation of said support structure when said first door assembly is in its second position, and said second door assembly is arranged to engage said base frame and prevent rotation of said support structure when said second door assembly is in its first position.

17. An apparatus for rotating heavy objects to facilitate inspecting a bottom side thereof, comprising:
   a base frame;
   a support structure rotatably connected to said base frame for rotation about a generally horizontal axis, said support structure having a first viewing side, a second receiving side, and a receptacle defined between said first and second sides;
   a first door assembly comprising at least one door rotatably mounted to said support structure to selectively open and close said first viewing side of said support structure, said first door assembly being arranged to engage said base frame and prevent rotation of said support structure when said first viewing side is open; and
   a second door assembly comprising at least one door slidably mounted to said support structure to selectively open and close said second receiving side of said support structure, said second door assembly being arranged to engage said base frame and prevent rotation of said support structure when said second receiving side is open.

* * * * *